(12) United States Patent
Boehm et al.

(10) Patent No.: US 11,369,957 B2
(45) Date of Patent: Jun. 28, 2022

(54) MEASUREMENT OF AN ANALYTE WITH A CARTRIDGE

(71) Applicant: Roche Diagnostics Operations, Inc., Indianapolis, IN (US)

(72) Inventors: Christoph Boehm, Vernheim (DE); Thorsten Brueckner, Schriesheim (DE); Sascha Lutz, Neustadt (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 319 days.

(21) Appl. No.: 16/116,174

(22) Filed: Aug. 29, 2018

(65) Prior Publication Data

US 2018/0369812 A1 Dec. 27, 2018

Related U.S. Application Data

(63) Continuation of application No. PCT/EP2017/059037, filed on Apr. 13, 2017.

(30) Foreign Application Priority Data

Apr. 14, 2016 (EP) .................................... 16165415

(51) Int. Cl.
*B01L 3/00* (2006.01)
*B01J 20/281* (2006.01)
*G01N 30/74* (2006.01)

(52) U.S. Cl.
CPC ..... *B01L 3/502715* (2013.01); *B01L 3/50273* (2013.01); *B01L 3/502723* (2013.01);
(Continued)

(58) Field of Classification Search
CPC .......... B01L 3/502715; B01L 3/50273; B01L 3/502723; B01L 2300/0864;
(Continued)

(56) References Cited

U.S. PATENT DOCUMENTS

| 8,114,351 B2 | 2/2012 | Degenhardt |
| 8,759,081 B2 | 6/2014 | Klaunick et al. |
| 8,911,684 B2 | 12/2014 | Augstein et al. |
| 2007/0166721 A1 | 7/2007 | Phan et al. |

(Continued)

FOREIGN PATENT DOCUMENTS

| CN | 204544220 U | 8/2015 |
| EP | 1939629 A2 | 7/2008 |
| JP | 2003-177139 A | 6/2003 |
| JP | 2014-190926 A | 10/2014 |

(Continued)

OTHER PUBLICATIONS

International Search Report dated Jul. 14, 2017, in Application No. PCT/EP2017/059037, 2 pp.

*Primary Examiner* — Samuel P Siefke
(74) *Attorney, Agent, or Firm* — Roche Diagnostics Operations, Inc.

(57) ABSTRACT

A method of performing an optical measurement of an analyte in a processed biological sample using a cartridge is provided. The cartridge is operable for being spun around a rotational axis. The method comprises: placing the biological sample into a sample inlet; controlling the rotational rate of the cartridge to process a biological sample into the processed biological sample using a fluidic structure; controlling the rotational rate of the cartridge to allow the processed biological sample to flow from the measurement structure inlet to an absorbent structure via a chromatographic membrane, and performing an optical measurement of a detection zone on the chromatographic membrane with an optical instrument. An inlet air baffle reduces evaporation of the processed biological sample from the chromatographic membrane during rotation of the cartridge.

19 Claims, 8 Drawing Sheets

(52) U.S. Cl.
CPC ........... *G01N 30/482* (2013.01); *G01N 30/74* (2013.01); *B01L 2200/027* (2013.01); *B01L 2200/0621* (2013.01); *B01L 2200/0684* (2013.01); *B01L 2200/142* (2013.01); *B01L 2300/04* (2013.01); *B01L 2300/0636* (2013.01); *B01L 2300/0803* (2013.01); *B01L 2300/0864* (2013.01); *B01L 2400/0406* (2013.01); *B01L 2400/0409* (2013.01)

(58) Field of Classification Search
CPC ......... B01L 2200/0621; B01L 2300/04; B01L 2200/027; B01L 2200/0684; B01L 2200/142; B01L 2300/0636; B01L 2300/0803; B01L 2400/0406; B01L 2400/0409; G01N 30/482; G01N 30/74
See application file for complete search history.

(56) References Cited

U.S. PATENT DOCUMENTS

| | | |
|---|---|---|
| 2009/0191643 A1 | 7/2009 | Boehm et al. |
| 2011/0189701 A1 | 8/2011 | Kim |
| 2011/0244598 A1 | 10/2011 | Fischer |
| 2014/0154664 A1 | 6/2014 | Kim et al. |
| 2014/0189624 A1 | 7/2014 | Segal et al. |

FOREIGN PATENT DOCUMENTS

| | | |
|---|---|---|
| JP | 2014-232064 A | 12/2014 |
| JP | 2016-006414 A | 1/2016 |
| WO | 1998/043083 A1 | 10/1998 |
| WO | 2014/061954 A1 | 4/2014 |
| WO | 2015/193194 A1 | 12/2015 |

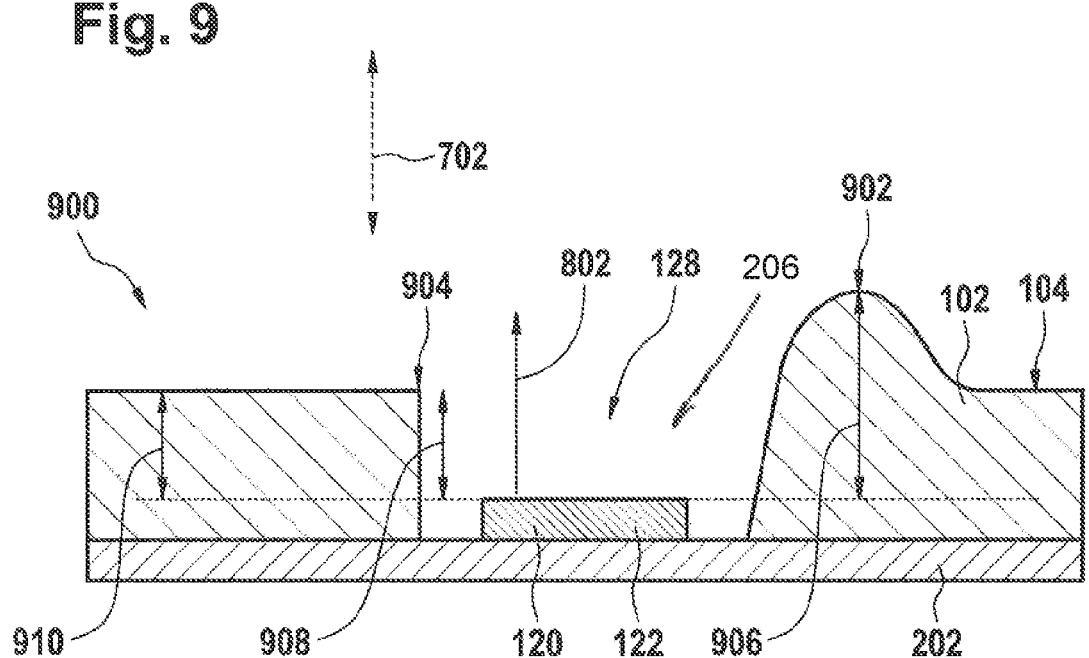
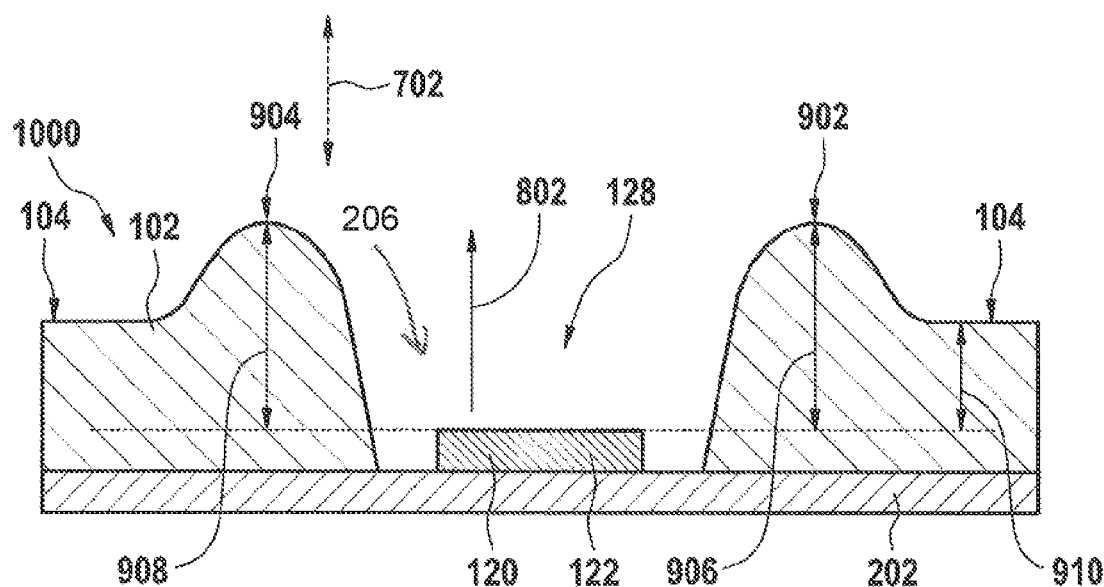

MEASUREMENT OF AN ANALYTE WITH A CARTRIDGE

CROSS-REFERENCE TO RELATED APPLICATIONS

This application is a continuation of International Patent Application No. PCT/EP2017/059037, filed 13 Apr. 2017, which claims the benefit of European Patent Application No. 16165415.7, filed 14 Apr. 2016, the disclosures of which are hereby incorporated herein by reference in their entirety.

TECHNICAL FIELD

The present disclosure relates to analytical test devices for biological samples, in particular to the design and use of rotatable cartridges for performing a measurement of a biological sample.

BACKGROUND

Two classes of analysis systems are known in the field of medical analysis: wet analysis systems, and dry-chemical analysis systems. Wet analysis systems, which essentially operate using "wet reagents" (liquid reagents), perform an analysis via a number of required step such as, for example, providing a sample and a reagent into a reagent vessel, mixing the sample and reagent together in the reagent vessel, and measuring and analyzing the mixture for a measurement variable characteristic to provide a desired analytical result (analysis result). Such steps are often performed using technically complex, large, line-operated analysis instruments, which allow manifold movements of participating elements. This class of analysis system is typically used in large medical-analytic laboratories.

On the other hand, dry-chemical analysis systems operate using "dry reagents" which are typically integrated in a test element and implemented as a "test strip", for example. When these dry-chemical analysis systems are used, the liquid sample dissolves the reagents in the test element, and the reaction of sample and dissolved reagent results in a change of a measurement variable, which can be measured on the test element itself. Above all, optically analyzable (in particular colorimetric) analysis systems are typical in this class, in which the measurement variable is a color change or other optically measurable variable. Electrochemical systems are also typical in this class, in which an electrical measurement variable characteristic for the analysis, in particular an electrical current upon application of a defined voltage, can be measured in a measuring zone of the test element using electrodes provided in the measuring zone.

The analysis instruments of the dry-chemical analysis systems are usually compact, and some of them are portable and battery-operated. The systems are used for decentralized analysis (also called point-of-care testing), for example, at resident physicians, on the wards of the hospitals, and in so-called "home monitoring" during the monitoring of medical-analytic parameters by the patient himself (in particular blood glucose analysis by diabetics or coagulation status by warfarin patients).

In wet analysis systems, the high-performance analysis instruments allow the performance of more complex multi-step reaction sequences ("test protocols"). For example, immunochemical analyses often require a multistep reaction sequence, in which a "bound/free separation" (hereafter "b/f separation"), i.e., a separation of a bound phase and a free phase, is necessary. According to one test protocol, for example, the sample can first be brought in contact with a specific binding reagent for the analyte which is immobilized onto a surface. This can be achieved for example by mixing the sample with beads comprising surfaces with such immobilized reagents or transporting the sample over surfaces or through porous matrices wherein the surfaces or the porous matrices comprise coatings of the immobilized reagents. A marking reagent can subsequently be brought in contact with this surface in a similar manner to mark the bound analyte and allow its detection. To achieve a more precise analysis, a subsequent washing step is often performed, in which unbound marking reagent is at least partially removed. Numerous test protocols are known for determining manifold analytes, which differ in manifold ways, but which share the feature that they require complex handling having multiple reaction steps, in particular also a b/f separation possibly being necessary.

Test strips and similar analysis elements normally do not allow controlled multistep reaction sequences. Test elements similar to test strips are known, which allow further functions, such as the separation of red blood cells from whole blood, in addition to supplying reagents in dried form. However, they normally do not allow precise control of the time sequence of individual reaction steps. Wet-chemical laboratory systems offer these capabilities, but are too large, too costly, and too complex to handle for many applications.

To close these gaps, analysis systems have been suggested which operate using test elements which are implemented in such a manner that at least one externally controlled (i.e., using an element outside the test element itself) liquid transport step occurs therein ("controllable test elements"). The external control can be based on the application of pressure differences (overpressure or low-pressure) or on the change of force actions (e.g., change of the action direction of gravity by attitude change of the test element or by acceleration forces). The external control can be performed by centrifugal forces, which act on a rotating test element as a function of the velocity of the rotation.

Analysis systems having controllable test elements are known and typically have a housing, which comprises a dimensionally-stable plastic material, and a sample analysis channel enclosed by the housing, which often comprises a sequence of multiple channel sections and chambers expanded in comparison to the channel sections lying between them. The structure of the sample analysis channel having its channel sections and chambers is defined by profiling of the plastic parts. This profiling is able to be generated by injection molding techniques or hot stamping. Microstructures, which are generated by lithography methods, increasingly being used more recently, however.

Analysis systems having controllable test elements allow the miniaturization of tests which have only been able to be performed using large laboratory systems. In addition, they allow the parallelization of procedures by repeated application of identical structures for the parallel processing of similar analyses from one sample and/or identical analyses from different samples. It is a further advantage that the test elements can typically be produced using established production methods and that they can also be measured and analyzed using known analysis methods. Known methods and products can also be employed in the chemical and biochemical components of such test elements.

In spite of these advantages, there is a further need for improvement. In particular, analysis systems which operate using controllable test elements are still too large. The most compact dimensions possible are of great practical significance for many intended applications.

BRIEF SUMMARY

It is against the above background that the embodiments of the present disclosure provide certain unobvious advantages and advancements over the prior art. In particular, the inventors have recognized a need for improvements in methods for measurement of an analyte with a cartridge.

In accordance with one embodiment of the present disclosure, a method of performing an optical measurement of an analyte in a processed biological sample using a cartridge is provided, wherein the cartridge is operable for being spun around a rotational axis. The cartridge comprises: a support structure comprising a front face; a fluidic structure for processing a biological sample into the processed biological sample, wherein the fluidic structure comprises a sample inlet for receiving the biological sample; and a measurement structure recessed from the front face, wherein the measurement structure comprises a chromatographic membrane, wherein the measurement structure comprises a measurement structure inlet connected to the fluidic structure to receive the processed biological sample, wherein the measurement structure comprises an absorbent structure, wherein the chromatographic membrane extends from the measurement structure inlet to the absorbent structure, wherein the chromatographic membrane comprises a detection zone, wherein the measurement structure comprises an inlet air baffle connected to the front face. The method further comprises: placing the biological sample into the sample inlet; controlling the rotational rate of the cartridge to process the biological sample into the processed biological sample using the fluidic structure; controlling the rotational rate of the cartridge to allow the processed biological sample to flow from the measurement structure inlet to the absorbent structure via the chromatographic membrane, wherein the inlet air baffle reduces the evaporation of the processed biological sample during rotation of the cartridge; and performing the optical measurement of the detection zone with an optical instrument.

In accordance with another embodiment of the present disclosure, a cartridge for an automatic analyzer is provided, wherein the cartridge is operable for being spun around a rotational axis. The cartridge comprises: a support structure, wherein the support structure comprises a front face; a fluidic structure for processing a biological sample into a processed biological sample, wherein the fluidic structure comprises a sample inlet for receiving the biological sample; and a measurement structure recessed from the front face, wherein the measurement structure comprises a chromatographic membrane, wherein the measurement structure comprises a measurement structure inlet connected to the fluidic structure to receive the processed biological sample, wherein the measurement structure comprises an absorbent structure, wherein the chromatographic membrane extends from the measurement structure inlet to the absorbent structure, wherein the measurement structure comprises an inlet air baffle connected to the front face.

In accordance with yet another embodiment of the present disclosure, a medical system is provided, wherein the medical system comprises a cartridge as described herein, wherein the medical system further comprises an automatic analyzer configured for receiving the at least one cartridge, wherein the automatic analyzer comprises a cartridge spinner, an optical instrument, and a controller configured to control the automatic analyzer, wherein the controller is configured for: controlling the rotational rate of the cartridge to process the biological sample into the processed biological sample using the fluidic structure; controlling the rotational rate of the cartridge to allow the processed biological sample to flow across the fluidic membrane from the measurement structure inlet to the absorbent structure via the chromatographic membrane, wherein the inlet air baffle reduces the evaporation of the buffer solution; and performing the optical measurement of the detection zone with the optical instrument.

These and other features and advantages of the embodiments of the present disclosure will be more fully understood from the following description in combination with the drawings and the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 9 shows an alternative cross sectional view of a cartridge;

FIG. 10 shows an alternative cross sectional view of a cartridge;

Figure 1:
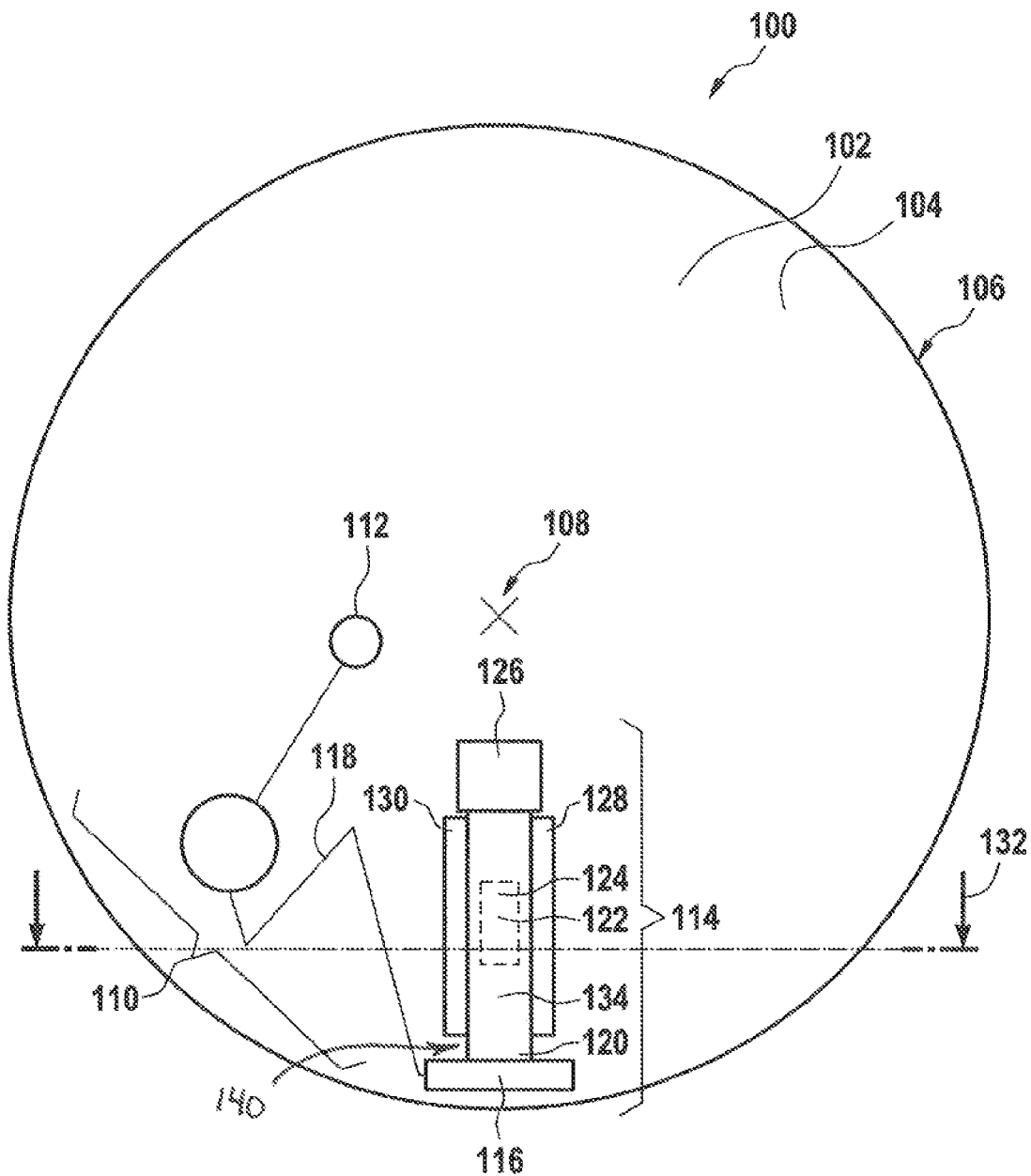
FIG. 1 shows an example of a cartridge.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

A cartridge as used here encompasses also any test element for processing a biological sample into a processed biological sample. The cartridge may include structures or components which enable a measurement to be performed on the biological sample. A typical cartridge is a test element as is defined and explained in U.S. Pat. No. 8,114,351 B2 and U.S. Patent Application Publication No. 2009/0191643 A1, the disclosures of which are hereby incorporated herein by reference. A cartridge as used herein may also be referred to as a centrifugal microfluidic disc, also known as "lab-on-a-disc", lab-disk or a microfluidic CD.

A biological sample as used herein encompasses as chemical product derived, copied, replicated, or reproduced from a sample taken from an organism. A blood sample is an example of a biological sample that is either whole blood or a blood product. The blood plasma may be considered to be a processed biological sample.

It is understood that references to biological samples and products below and in the claims may be modified such that they refer to blood samples and/or blood products.

In accordance with one embodiment, the present disclosure provides for a method of performing an optical measurement of an analyte in a processed biological sample using a cartridge. The cartridge is operable for being spun around a rotational axis. The cartridge comprises a support structure comprising a front face. The cartridge further comprises a fluidic structure for processing a biological sample into the processed biological sample. The fluidic structure comprises a sample inlet for receiving the biological sample.

The cartridge further comprises a measurement structure recessed from the front face. This may be alternately worded as the measurement structure is located below the front face. The measurement structure comprises a chromatographic membrane.

The chromatographic membrane may be referred to as a capillary-active zone. In one embodiment, the capillary-active zone comprises a porous, absorbent matrix. In one embodiment of the test element according to the disclosure, the second end of the capillary-active zone near to the axis adjoins a further absorbent material or an absorbent structure such that it can take up liquid from the capillary-active zone. The capillary-active zone and the further absorbent material typically slightly overlap for this purpose. The further material or the further absorbent structure serve on the one hand, to assist the suction action of the capillary-active zone and in particular of the porous, absorbent matrix and, on the other hand, serve as a holding zone for liquid which has already passed through the capillary-active zone. In this connection the further material can consist of the same materials or different materials than the matrix. For example, the matrix can be a membrane and the further absorbent material can be a fleece or a paper. Other combinations are of course equally possible.

The measurement structure further comprises a measurement structure inlet connected to the fluidic structure to receive the processed biological sample. The measurement structure further comprises an absorbent structure. The absorbent structure is nearer to the rotational axis than the capillary-active zone. In some examples, the absorbent structure may support the complete transport of the processed biological sample across or through the capillary-active zone and may also serve as or be a waste-fleece by binding the processed fluids and/or additional fluids like washing buffers, thus avoiding their leakage and thereby contamination of the instrument or user.

The chromatographic membrane extends from the measurement structure inlet to the absorbent structure. The absorbent structure may be absorbent and therefore fluids or liquids that are placed in the measurement structure inlet may wick to the absorbent structure. The chromatographic membrane comprises a detection zone. The measurement structure comprises an inlet air baffle connected to the front face. An air baffle as used herein is a mechanical structure that is used to restrict the flow of air or other gas. The inlet air baffle serves as a vent to the atmosphere surrounding the cartridge to the chromatographic membrane.

The method comprises placing the biological sample into the sample inlet. The method further comprises controlling the rotational rate of the cartridge to process the biological sample into the processed biological sample using the fluidic structure. In different examples this may take different forms. For example, the biological sample may be diluted, or it may be mixed with other chemicals which change the biological sample chemically or the biological sample may be mixed with antibodies that react with the analyte and provide markers which can then be layered on the chromatographic membrane. The method further comprises controlling the rotational rate of the cartridge to allow the processed biological sample to flow from the measurement structure inlet to the absorbent structure via the chromatographic membrane.

The absorbent structure serves on the one hand, to assist the suction action of the chromatographic membrane or capillary-active zone and in particular of the porous, absorbent matrix and, on the other hand, serve as a holding zone for liquid which has already passed through the capillary-active zone. In this connection the further material can consist of the same materials or different materials than the matrix. For example, the matrix can be a membrane and the further absorbent material can be a fleece or a paper. Other combinations are of course equally possible.

The air inlet baffle reduces the evaporation of the processed biological sample during rotation of the cartridge. The method further comprises performing the optical measurement of the detection zone with an optical instrument. The optical instrument for example may be a spectrographic instrument.

This embodiment may be beneficial because the air inlet baffle may reduce the access of air or the atmosphere surrounding the cartridge when it is spun. Reducing the evaporation of the processed biological sample may be beneficial in that it may provide for more accurate measurements. In other cases, because the evaporation is reduced, the biological sample may function if a smaller volume is used. In other examples the inlet air baffle may provide the benefit that less additional fluid needs to be mixed with the biological sample to turn it into the processed biological sample.

The fluidic structure may contain a reagent zone which contains a conjugate of an analyte binding partner (typically an antibody or an immunologically active antibody fragment capable of analyte binding if the analyte is an antigen or hapten, or an antigen or hapten if the analyte is an antibody) and a label which can be detected directly or indirectly by visual, optical or electrochemical means, wherein the conjugate can be dissolved by the liquid sample. Suitable labels are, for example, enzymes, fluorescent labels, chemiluminescent labels, electrochemically active groups or so-called direct labels such as metal or carbon labels or colored lattices. This zone may also be referred to as the conjugate zone.

The conjugate zone can serve also as a sample application zone or a separate sample application zone can be located on the test element. The conjugate zone can, in addition to the conjugate of analyte binding partner and label described above, also contain an additional conjugate of a second analyte binding partner (which is in turn typically an antibody or an immunologically active antibody fragment capable of analyte binding) and a tagging substance which is itself a partner in a binding pair. The tagging substance can for example be biotin or digoxigenin and can be used to immobilize a sandwich complex consisting of labelled conjugate, analyte and tagged conjugate in the detection and/or control zone.

The chromatographic membrane may additionally comprise a detection zone which contains a permanently immobilized binding partner (i.e., one that cannot be detached by the liquid sample) for the analyte or for complexes containing the analyte. The immobilized binding partner is in turn typically an antibody or an immunologically active antibody fragment capable of analyte binding or an antigen or (poly) hapten. If one of the above-mentioned tagged conjugates is used which for example comprises biotin or digoxigenin together with an analyte binding partner, the immobilized binding partner can also be streptavidin or polystreptavidin and an anti-digoxigenin antibody.

Finally, there may also be a control zone in or on the chromatographic membrane which contains a permanently immobilized binding partner for the conjugate of analyte binding partner and label for example in the form of an immobilized polyhapten which acts as an analyte analogue and is able to bind the analyte binding partner from the labelled conjugate. The control zone may additionally contain one or more permanently immobilized binding partner(s) for the analyte or for complexes containing the analyte. The latter binding partners can be selected from the same compounds which were described above in connection with the immobilized binding partners of the detection zone. These immobilized binding partners in the detection zone and in the control zone are typically identical. They may, however, also be different for example in that a binding partner for a biotin-tagged conjugate (hence, e.g., polystreptavidin) is immobilized in the detection zone and an anti-analyte antibody is immobilized in the control zone in addition to the polyhapten. In the latter case the anti-analyte antibody that is additionally immobilized in the control zone should be directed against (another) independent epitope and thus one that is not recognized by the conjugate antibodies (biotin-tagged conjugate and labelled conjugate).

In another embodiment, the air inlet baffle is closer to the rotational axis than the measurement structure inlet. The inlet baffle is configured for regulating a flow of air over the measurement structure during rotation of the cartridge about the rotational axis. This embodiment may be beneficial because the controlled airflow may allow for both improved visibility of the chromatographic membrane (during measurement) and reduced evaporation from the chromatographic membrane. In contrast, FIG. 2 of U.S. Patent Application Publication No. US 2009/0191643 A1 shows two small vent openings which only function to enable the fluidic structures to be filled with samples or washing liquid.

In another embodiment, the absorbent structure is a waste fleece.

In another embodiment, the chromatographic membrane can contain one or more zones containing immobilized reagents.

Specific binding reagents for example specific binding partners such as antigens, antibodies, (poly) haptens, streptavidin, polystreptavidin, ligands, receptors, nucleic acid strands (capture probes) are typically immobilized in the capillary-active zone and in particular in the porous, absorbent matrix. They are used to specifically capture the analyte or species derived from the analyte or related to the analyte from the sample flowing through the capillary-active zone. These binding partners can be present immobilized in or on the material of the capillary-active zone in the form of lines, points, patterns or they can be indirectly bound to the capillary-active zone, e.g., by means of so-called beads. Thus, for example, in the case of immunoassays one antibody against the analyte can be present immobilized on the surface of the capillary-active zone or in the porous, absorbent matrix which then captures the analyte (in this case an antigen or hapten) from the sample and also immobilizes it in the capillary-active zone such as, e.g., the absorbent matrix. In this case the analyte can be made detectable for example by means of a label that can be detected visually, optically or fluorescence-optically by further reactions, for example by additionally contacting it with a labelled bindable partner.

In another embodiment, the fluidic structure contains a first specific binding partner of the analyte with a detectable label and a second specific binding partner with a capture label. These both form a binding complex with the analyte. This may consist of a first specific binding partner, a second specific binding partner and an analyte. This may additionally provide for a measurement structure within the immobilized binding partner specific to the capture label of the second specific binding partner.

In another embodiment, the detection is fluorescence-based.

In another embodiment, the label is particle-based fluorescent label.

In another embodiment, the chromatographic membrane contains an optical calibration zone. The optical calibration zone may for example be a region on the measurement structure which contains a defined amount of the immobilized label and provides a means for checking if the optics of the instrument is functioning properly and if not, to calibrate it adequately. In other embodiments, the optical calibration zone is located at different locations on the test element.

In another embodiment, the measurement structure contains a reagent and flow control zone. This may provide for a means of checking if the cartridge is functioning properly in terms of reagents and immunochromatography. There may be for example two different control zones, a reagent/flow-control and an optical calibration zone as instrument control zone for correcting the intensity of the radiation or excitation source when an optical measurement is made.

In another embodiment, the cartridge is disk-shaped or at least partially disk-shaped.

In another embodiment, the cartridge may have an outer edge which fits within a circle drawn around the rotational axis.

In another embodiment, the cartridge has an outer edge. The outer edge may have a portion or portions that are circularly symmetric around the rotational axis.

In another embodiment, the method further comprises placing the buffer solution at the measurement structure inlet after controlling the rotational rate of the cartridge to allow the processed biological sample to flow from the measurement structure inlet to the absorbent structure via the chromatographic membrane. The method further comprises cleaning or washing the chromatographic membrane by controlling the rotational rate of the cartridge to allow the buffer solution to flow from the measurement structure inlet to the absorbent structure via the chromatographic membrane before performing the optical measurement. The use of the buffer solution may be beneficial because it may provide for a more accurate and reproducible measurement of the analyte. The use of the cartridge with the inlet air baffle may further increase this benefit as it may reduce the evaporation of the buffer solution in addition to reducing the evaporation of the biological sample. This may allow less buffer solution to be used and may also provide for a more controlled transport of the buffer solution across the chromatographic membrane to the absorbent structure.

In another aspect, the present disclosure provides for a cartridge for an automatic analyzer. The cartridge is operable for being spun about a rotational axis. The cartridge comprises a support structure. The support structure comprises a front face. The cartridge further comprises a fluidic structure for processing a biological sample into a processed biological sample. The fluidic structure comprises a sample inlet for receiving the biological sample. The cartridge further comprises a measurement structure recessed from the front face. The measurement structure comprises a chromatographic membrane. The measurement structure comprises a measurement structure inlet connected to the fluidic structure to receive the processed biological sample. The measurement structure comprises an absorbent structure. The chromatographic membrane extends from the measurement structure inlet to the absorbent structure. The measurement structure comprises an air inlet baffle connected to the front face.

In another embodiment, the air inlet baffle is closer to the rotational axis than the measurement structure inlet. This embodiment may have the benefit of enabling the control of an airflow across the chromatographic membrane.

In another embodiment, there is a gap between the air inlet baffle and the measurement structure inlet. This embodiment may have the benefit of better controlling the flow of air over the chromatographic membrane.

In another embodiment, the gap is over the chromatographic membrane. This embodiment may have the benefit of reducing airflow through the measurement structure inlet. This is because it may be beneficial to reduce airflow through the measurement structure inlet to reduce evaporation.

In another embodiment, the inlet baffle is configured for regulating a flow of air over the measurement structure during rotation of the cartridge about the rotational axis. This embodiment may have the benefit of providing precise control of the evaporation rate of fluid from the chromatographic membrane at the same time that the visibility of the chromatographic membrane is controlled. For example, if there is a static cover over the chromatographic membrane, the relationship between how much fluid is evaporated from the chromatographic membrane and the reduction of the condensation on the static cover can be controlled.

In another embodiment, the air inlet baffle is directly connected to the chromatographic membrane. This may have the benefit of reducing evaporation from the measurement structure inlet.

In another embodiment, the measurement structure inlet and the air inlet baffle are connected via a path entirely over the chromatographic membrane. This may have the benefit of reducing evaporation from the measurement structure inlet.

In another embodiment, the measurement structure inlet and the air inlet baffle are disjoint. "Disjoint" as used herein is understood to mean that the measurement structure inlet and the air inlet baffle are not directly connected. They are connected via an air volume over the chromatographic membrane. This may have the benefit of reducing evaporation from the measurement structure inlet.

In another embodiment, the measurement structure inlet is vented via an air volume over the chromatographic membrane. This may have the benefit of reducing evaporation from the measurement structure inlet.

In another embodiment, the measurement structure further comprises a static cover for covering the chromatographic membrane. The static cover comprises an optically transparent area. The optically transparent area may be considered to be an optically transparent window or zone also. Optically transparent as used herein encompasses being transparent to at least a portion of the electromagnetic spectrum which is in the optical or near optical range. In the context of making the optical measurement using the cartridge optically transparent could be interpreted as being optically transparent at the wavelengths at which the optical measurement is made.

The optically transparent area is fixed in alignment with the detection zone of the chromatographic membrane. In other words, the optically transparent area is not able to move in relation to the detection zone of the chromatographic membrane. The optically transparent area is therefore immobile in space relative to the chromatographic membrane. The measurement structure further comprises an air outlet baffle connected to the front face. The measurement structure is vented by the outlet air baffle and the inlet air baffle. This embodiment may be beneficial because fluid in the form of the processed biological sample or even a buffer solution is transported across the chromatographic membrane. When fluid or liquid is transported across the chromatographic membrane there may be evaporation of the liquid or fluid which is then deposited on the inside of the optically transparent area. Having an inlet and outlet air baffle may be beneficial because a small amount of transported air may reduce the chance that condensation on the optically transparent area obstructs the optical measurement of the detection zone. However, the use of the inlet air baffle and the outlet air baffle restricts the amount of evaporation in total. A controlled amount of air going through the space above the chromatographic membrane and below the optically transparent area reduces the total amount of evaporation while still allowing for enough transport of moisture away from the optically transparent area that the optical measurement can still be performed.

In another embodiment, the measurement structure comprises an air volume formed at least partially by the static cover. The air volume formed by the static cover is then vented by the inlet air baffle and the outlet air baffle. The inlet air baffle and outlet air baffle seek to reduce evaporation from the chromatographic membrane while at the same time allowing for the transport of moisture away from the optically transparent area.

In another embodiment, the detection zone has a detection zone length in a radial direction. That is to say one could draw a line from the rotational axis past the detection zone. The detection zone length is then the length or extension of the detection zone along this radial line. The inlet air baffle has an inlet air baffle length in the radial direction. The outlet air baffle has an outlet air baffle length also in the radial direction. The inlet air baffle length and/or the outlet air baffle length is less than the detection zone length. This embodiment may be beneficial because the inlet air baffle and the outlet air baffle when they are shorter than the detection zone in the radial direction may provide for effective venting of the air adjacent to the optically transparent area.

It is understood that when describing the radial direction, the radial direction may rotate as a particular structure is measured. For example, the detection zone length may be in a first radial direction that passes through the detection zone. The outlet air baffle length may be a second radial direction that passes through the outlet air baffle. Likewise, the inlet air baffle length may be a length measured in a third radial direction that passes through the inlet air baffle.

In another embodiment, one of the outlet air baffle and the inlet air baffle is closer to the rotational axis than the other. In one example the outlet air baffle is closer to the rotational axis than the inlet air baffle. In the other case, the inlet air baffle is closer to the rotational axis than the outlet air baffle. This embodiment may be beneficial because it may force any air going from the inlet air baffle to the outlet air baffle to follow a path across the optically transparent area. This may provide for reduced condensation on the optically transparent area.

In another embodiment, the detection zone has a detection zone length in a radial direction. The inlet air baffle has an inlet air baffle length in the radial direction. The outlet air baffle has an outlet air baffle length in the radial direction. The inlet air baffle length and/or the outlet air baffle length is greater than or equal to the detection zone length. The details of the radial direction, regarding the detection zone length, the inlet air baffle length, and the outlet air baffle length discussed in the above embodiment also apply to this embodiment.

In another embodiment, the outlet air baffle and the inlet air baffle may be the same distance to the rotational axis.

In another embodiment, the inlet air baffle has a first continually smooth surface where the inlet air baffle meets the front face and/or wherein the outlet air baffle has a first continually smooth surface where the inlet air baffle meets the front face. The smooth surface where the baffles meet the front face may serve to reduce the amount of turbulence generated by the inlet and outlet air baffles. This may help reduce the amount of fluid lost from the chromatographic membrane through evaporation.

In another embodiment along a circumferential path across the detection zone the static cover has a first edge and a second edge. A circumferential path is a path which is circular and is drawn about the rotational axis. The first edge is a first distance from the chromatographic membrane along the rotational axis. A distance measure along the rotational axis is implied herein to mean a distance which is measured in a direction parallel to the rotational axis. For example, the first distance is the distance measured from the chromatographic membrane to the first edge parallel to the rotational axis. Other references to distances along the rotational axis are also to be interpreted as meaning a distance measured which is parallel to the rotational axis.

The second edge is a second distance from the chromatographic membrane along the rotational axis. The first distance is less than the second distance. Adjacent to the first edge the front face has a third distance from the chromatographic membrane along the rotational axis. The first distance is greater than the third distance. At the front face the static cover is continually smooth between the first edge and the second edge. This embodiment may be beneficial because the inlet air baffle is formed where the first edge is. The air inlet baffle at this point forms a scoop-like structure. When the disk is rotated such that the first edge moves towards the position of the second edge then air is not scooped into the air inlet baffle. The disk for instance may be run in this direction to reduce the amount of evaporation typically from the chromatographic membrane. When the disk is rotated in the other direction about the rotational axis, that is to say the second edge is moved towards where the first edge currently is, then the first edge being slightly above the front face or above it acts as a scoop that preferentially brings air into the space beneath the optically transparent area. This embodiment may offer better management of the trade-off between keeping the optically transparent area clean of condensation and also to balance this against the evaporation of fluid from the chromatographic membrane.

In another embodiment adjacent to the second edge the front face is a fourth distance from the chromatographic membrane along the rotational axis. The fourth distance is greater than or equal to the first distance. This embodiment may be beneficial because the outlet air baffle then does not have the effect of scooping air into the space beneath the optically transparent area. This may embody the cartridge to have two different effects of air passing through or beyond the optically transparent area.

In another embodiment, the entire measurement zone is open to the front face via the first air baffle structure along a directed path. In other words, the entire measurement zone is able to be exposed to direct measurement from an optical instrument. There is no optically transparent region which shields the measurement zone of the chromatographic membrane in this embodiment. The directed path is parallel to the rotational axis. This embodiment may provide for a better measurement of the measurement zone using the optical instrument.

In another embodiment, the measurement structure comprises at least one air pocket adjacent to the chromatographic membrane. The at least one air pocket is covered by the front face parallel to the rotational axis. This means that if one starts in the air pocket and then traces a path in a direction parallel to the rotational axis, the front face shields or covers the air pocket. The air pocket for instance may be a region adjacent to the chromatographic membrane which is covered by the front face. The use of the air pocket may be beneficial because it may help to trap air around the chromatographic membrane and reduce the evaporation.

In another embodiment, the measurement zone is within certain spots or locations of the chromatographic membrane. The inlet air baffle and the outlet air baffle may be holes or multiple holes which are located in the front face in a direction parallel to the rotational axis.

In another embodiment along a circumferential path across the detection zone the inlet air baffle has a first air baffle edge and a second air baffle edge where the inlet air baffle meets the front face. The first air baffle edge and the second air baffle edge for instance may be a raised area of the front face which helps to prevent air from reaching the chromatographic membrane as the cartridge is rotated about the rotational axis.

In another embodiment along the rotational axis the first air baffle edge is further from the chromatographic membrane than the second air baffle edge. This may be beneficial because the first air baffle edge may be used to disrupt the flow of air to the chromatographic membrane and placing the second air baffle edge closer to the chromatographic membrane may reduce the amount of turbulence. This may help to reduce evaporation from the chromatographic membrane.

In another embodiment, the front face has an average distance from the chromatographic membrane along the rotational axis. The first air baffle edge and the second air baffle edge are further from the chromatographic membrane than the front face along the rotational axis. Placing the first air baffle edge and the second air baffle edge further away from the chromatographic membrane may reduce the amount of evaporation from the chromatographic membrane.

The first air baffle edge and the second air baffle edge may also be described as ridges or raised areas adjacent to the chromatographic membrane. The average distance of the front face may be taken about a circumference or rotational path about the rotational axis.

In another aspect, the present disclosure provides for a medical system. The medical system comprises a cartridge according to any one of the preceding embodiments. The medical system further comprises an automatic analyzer configured for receiving the at least one cartridge. The automatic analyzer comprises a cartridge spinner, an optical instrument, and a controller configured to control the automatic analyzer.

The controller is configured to control the rotational rate of the cartridge to process the biological sample into the processed biological sample using the fluidic structure. The processed biological sample is mixed with the buffer solution. In some examples the automatic analyzer may also place the biological sample into the sample inlet. However, in other examples this may be done by an operator before placing the at least one cartridge into the automatic analyzer. The controller is further configured to control the rotational rate of the cartridge to allow the processed biological sample to flow across the chromatographic membrane from the measurement structure. The inlet air baffle reduces the evaporation of the processed biological sample. The controller is further configured to control the optical instrument to perform the optical measurement of the detection zone with the optical instrument.

In another embodiment the medical system comprises the at least one cartridge.

It is understood that one or more of the aforementioned embodiments and/or examples of the disclosure may be combined as long as the combined embodiments are not mutually exclusive.

In order that the embodiments of the present disclosure may be more readily understood, reference is made to the following examples, which are intended to illustrate the disclosure, but not limit the scope thereof.

Like numbered elements in these figures are either equivalent elements or perform the same function. Elements which have been discussed previously will not necessarily be discussed in later figures if the function is equivalent.

FIG. 1 shows a top view of a cartridge 100. The cartridge comprises a support structure 102. The front face 104 is facing towards the viewer in this view. The cartridge 100 is circular and has an edge 106 that is rotationally symmetric about a rotational axis 108. In this example the rotational axis 108 is viewed directly on in this front view. In other examples the edge 106 may not be rotationally symmetric about the entire edge 106. There may for example be flat regions which are useful for holding or gripping the cartridge 100. The cartridge 100 comprises a fluidic structure 110 which is within the support structure 102. The fluidic structure 110 may comprise a sample inlet 112. The cartridge 100 also comprises a measurement structure 114. The measurement structure 114 comprises a measurement structure inlet 116 which has a connection 118 to the fluidic structure 110. The sample inlet 112 may be for receiving a biological sample. The fluidic structure 110 is intended to be arbitrary and represent a fluidic structure which can be used to process the biological sample into a processed biological sample which can then be transported via the connection 118 to the measurement structure inlet 116.

The measurement structure 114 further comprises a chromatographic membrane 120 which is recessed from the front face 104. The measurement structure 114 also comprises an absorbent structure 126 which is absorbent. Fluid placed in the measurement structure inlet 116 will wick through or across the chromatographic membrane 120 towards the absorbent structure 126. There may be antibodies or other reactive chemicals placed on the chromatographic membrane 120 within a detection zone 122. Portions of the analyte to be measured may then stick or stay at the detection zone 122. Other antibodies added with the fluidic structure 110 may for instance contain fluorescent markers which may be detected by an optical instrument. The front face 104 may have an optically transparent area 124 above the detection zone 122 such that optical measurements can be performed. In this example there is a static cover 134. The optically transparent area 124 is a region of the static cover 134.

As fluid is transported across the chromatographic membrane 120 there may be condensation which builds up on the underside of the optically transparent area 124 that is adjacent to the chromatographic membrane 120. This may cause condensation which may cause errors or prevent the optical measurement of the detection zone 122. To prevent this there is an inlet air baffle 128 and an outlet air baffle 130. This enables a small or reduced amount of air to pass beneath the optically transparent area 124 to help keep it free from condensation. Above the chromatographic membrane 120 is a portion of the front face 104. Having a structure such as plastic above the chromatographic membrane 120 helps to reduce evaporation. This may increase the reproducibility and/or sensitivity of the measurement of the analyte by optical means.

In FIG. 1, it can be seen that the air inlet baffle 128 is closer to the rotational axis 108 than the measurement structure inlet 116. In this FIG. 1 there is a gap 140 between the air inlet baffle 128 and the measurement structure inlet 116. The measurement structure inlet clearly provides for an airflow that is directed away from the measurement structure inlet 116.

The system illustrated in FIG. 1 is intended to be representative. There may also be a system for dispensing a buffer solution to the measurement structure inlet 116. This is not shown in FIG. 1, but it may be beneficial that after the processed biological sample has been transported across the detection zone 122 that a buffer is used to wash and help clean the chromatographic membrane 120. This may increase the sensitivity and/or reproducibility of the measurement of the analyte.

Figure 2:
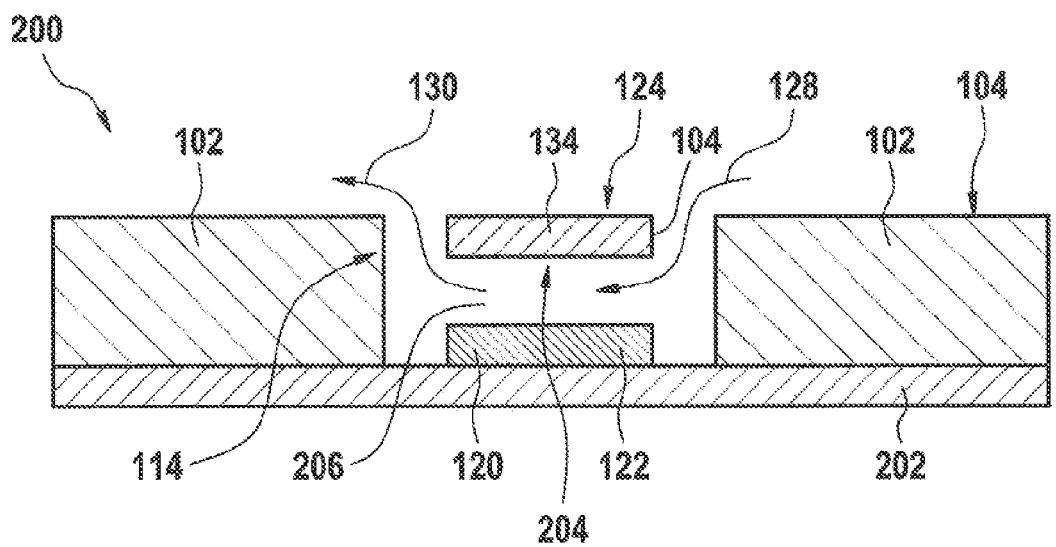
FIG. 2 shows a cross sectional view of the cartridge of FIG. 1.

The dashed line 132 shows a cross-section which is used to illustrate a cross-sectional view in FIG. 2.

FIG. 2 shows a cross-sectional view 200 along the dashed line 132 of FIG. 1. The cross-sectional view 200 shows the support structure 102. The support structure 102 for instance may be molded plastic which contains the fluidic structure that is molded. In this FIG. 2, an air volume 206 between the static cover 134 and the chromatographic membrane 122 is shown.

Figure 3:
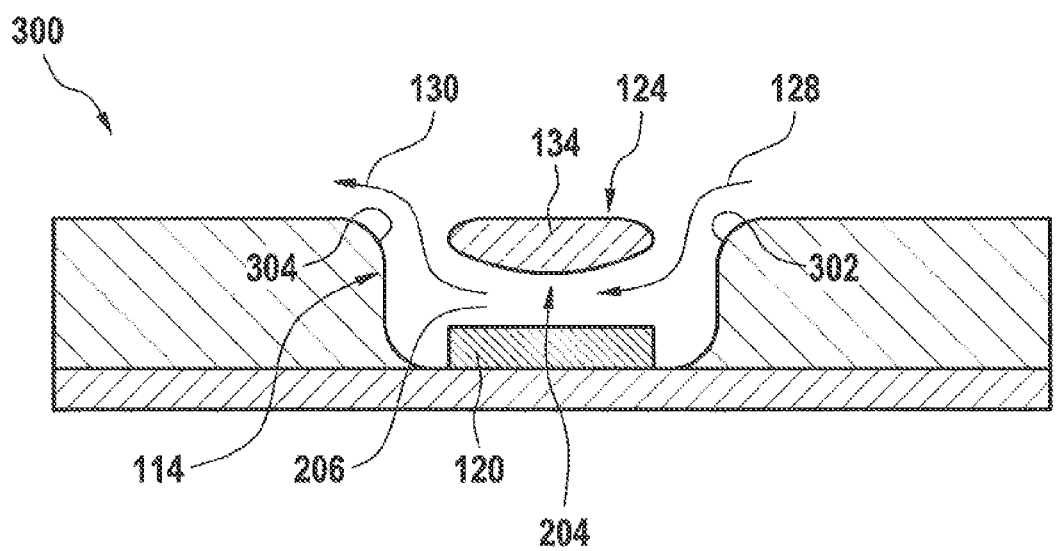
FIG. 3 shows an alternative cross sectional view of the cartridge of FIG. 1.

FIG. 3 shows an alternate cross-sectional view 300. The example shown in FIG. 3 is similar to that in FIG. 2 except the surfaces of the inlet air baffle 128 and the outlet air baffle 130 have been more smoothed to reduce turbulence. The smooth surfaces may reduce the chances of turbulence forming within the air volume 206. This may further reduce the amount of evaporation from the chromatographic membrane 120. It can be seen that the inlet air baffle 128 has a first continuously smooth surface 302. The outlet air baffle 130 has a second continuously smooth surface 304. The optically transparent area 124 also is shown as having been smoothed.

Figure 4:
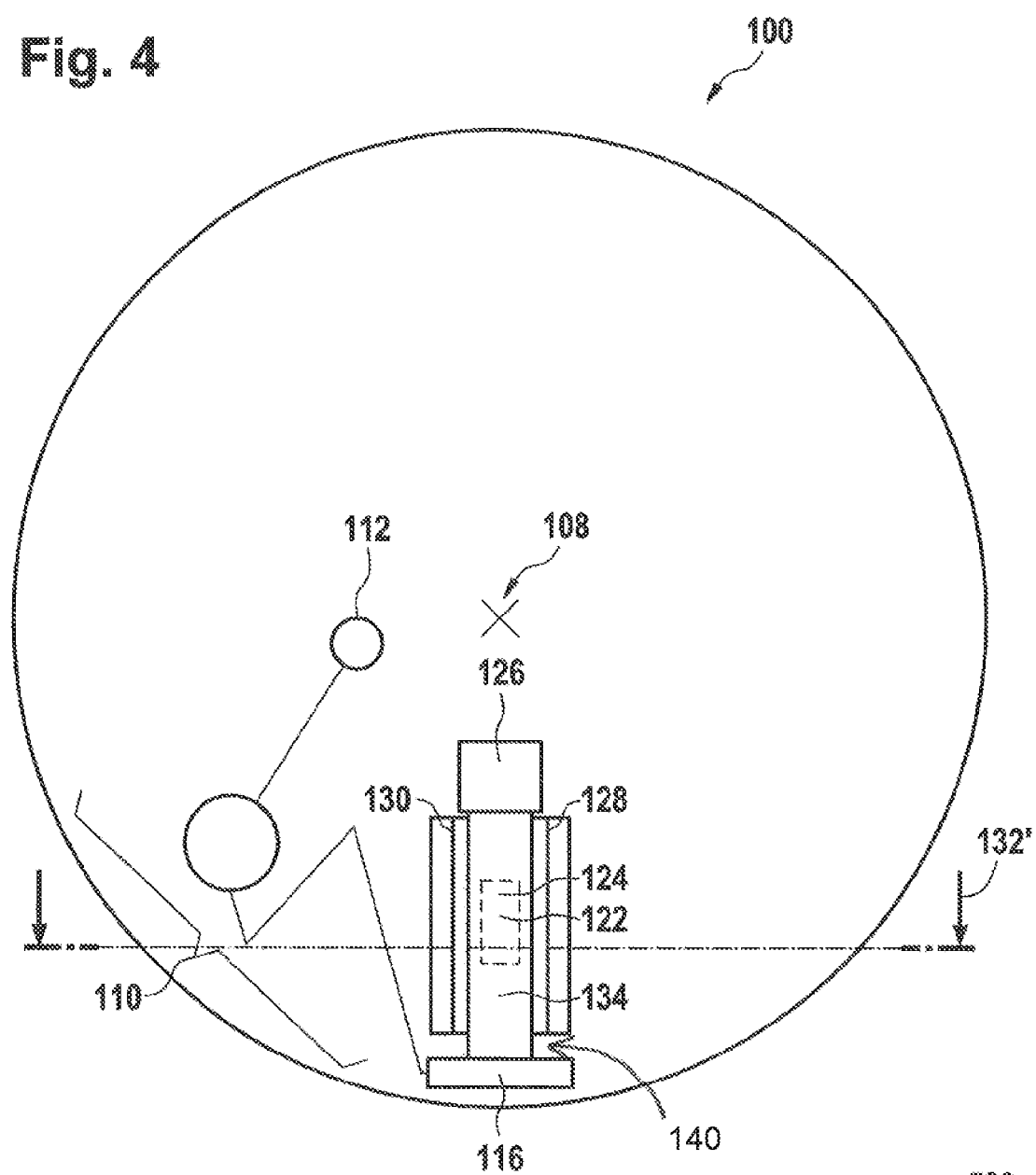
FIG. 4 shows an alternative example of a cartridge.

FIG. 4 shows a modification of the cartridge 100 as shown in FIG. 1. The structures shown in FIG. 4 are nearly identical to those shown in FIG. 1 except the inlet air baffle 128 and the outlet air baffle 130 are constructed differently. The dashed line 132' shows a further cross-sectional view which is illustrated in FIG. 5.

Figure 5:
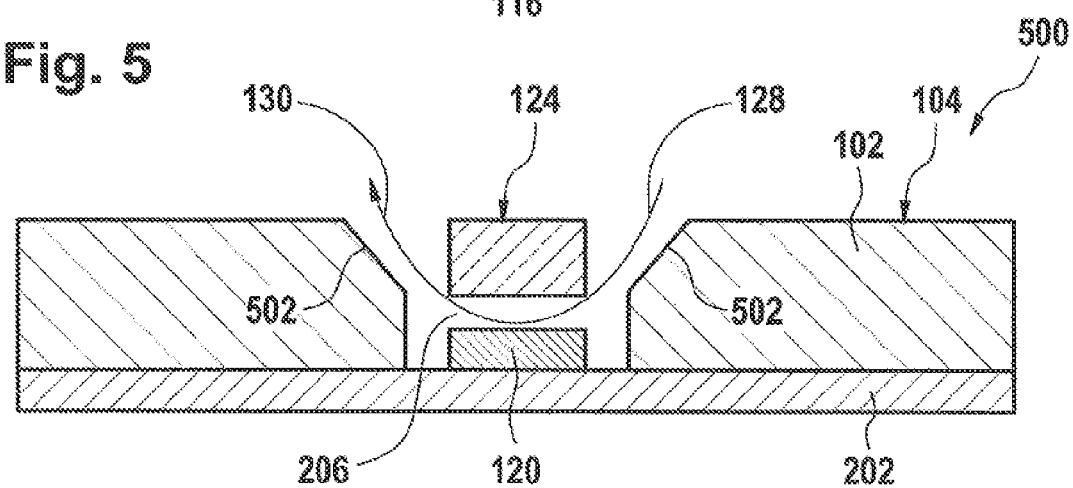
FIG. 5 shows a cross sectional view of the cartridge of FIG. 4.

In the cross-sectional view 500 of FIG. 5 it can be seen that the structure is nearly identical with what is present in FIG. 2. In this example the optically transparent area 124 has been made thicker to reduce airflow through the air volume

206. Also the inlet air baffle 128 and the outlet air baffle 130 have been enlarged by placing a chamfer 502 in the support structure 102. This may help to further reduce turbulence and reduce evaporation at the chromatographic membrane 120.

Figure 6:
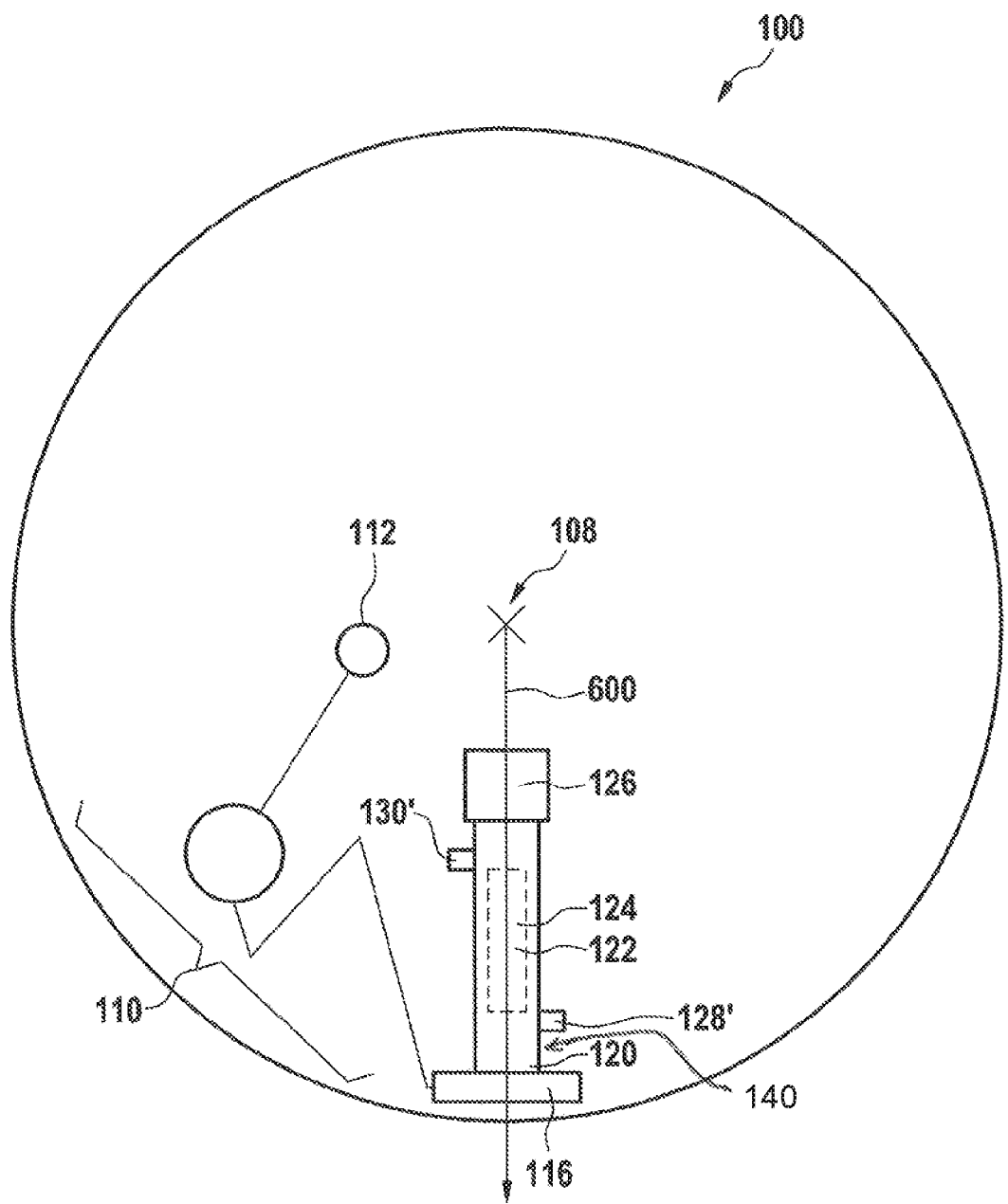
FIG. 6 shows an alternative example of a cartridge.

FIG. 6 shows a further variant of the cartridge 100. The example shown in FIG. 6 is very similar to the example shown in FIG. 1 except in this case the inlet air baffle 128' has become smaller than is shown in FIG. 1. Likewise, the outlet air baffle 130' is also smaller than the outlet air baffle 130 in FIG. 1. In this FIG. 6 can be seen a line 600 which is drawn from the rotational axis 108 through the detection zone 122. When measured along the line 600, it can be seen that the outlet air baffle 130' and the inlet air baffle 128' have been made smaller along the direction 600 than was in previous embodiments. The inlet 128' and the outlet 130' are now smaller in dimension than the detection zone 122. One of the two is also placed closer to the rotational axis 108 than the other. Reducing the size of the inlet 128' and outlet 130' may have the effect of reducing the amount of evaporation from the chromatographic membrane 120. Also their placement can be used to force air going from the inlet 128' to the outlet 130' to follow a particular path across the optically transparent area 124. In this particular example the outlet air baffle 130' is shown as being closer to the rotational axis 104 than the inlet air baffle 128'. These two may be reversed. There is again a gap 140 between the air inlet baffle 128' and the measurement structure inlet 116.

Figure 7:
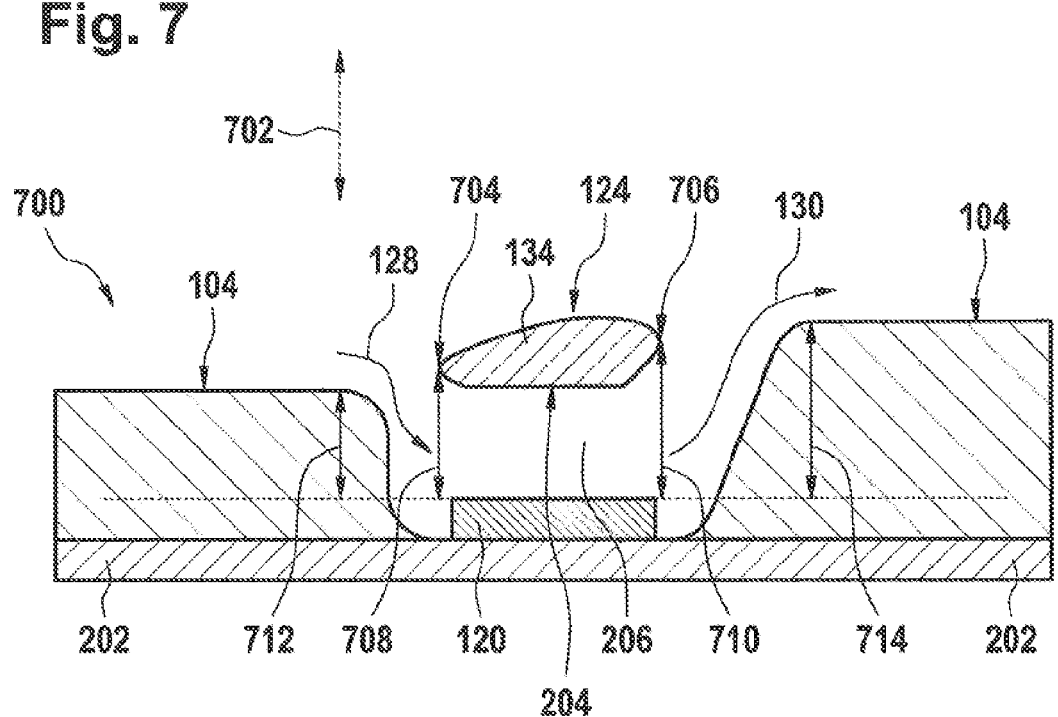
FIG. 7 shows an alternative cross sectional view of a cartridge.

FIG. 7 shows a further cross-sectional view 700 which is alternate to those shown in FIGS. 2, 3, and 5. In the example shown in FIG. 7 there is a static cover 134 which is sloped. The cross-sectional view has the appearance of an air foil. The static cover 134 in this shape has the effect of either directing air away from the air volume 206 or directing air into it. This can be used to preferentially reduce evaporation from the chromatographic membrane 120 or to force a small amount of air into the air volume 206 to remove or prevent condensation on the underside 204. The static cover 134 is part of the front face 104 and is fixed in position over the chromatographic membrane 120.

The thickness of the static cover 134 varies when measured along the direction 702. It is possible that this variation in thickness acts as a lens for light coming from the chromatographic membrane 120. In some cases, the optical measurement system may have an optical component or lens which compensates for this effect.

In FIG. 7 it can be seen that the static cover 134 has a first edge 704 and a second edge 706. The dashed line 702 indicates a direction parallel to the rotational axis. Measured parallel to the rotational axis 702 the first edge 704 is a first distance 708 from the chromatographic membrane 120. The second edge 706 is a second distance 710 from the chromatographic membrane 120. The distance 708 is smaller than the distance 710. It can also be seen in this FIG. 7 that the front face 104 on either side of the static cover 134 has portions which are different distances from the chromatographic membrane 120. Adjacent to the first edge 704 the front face 104 is a third distance 712 from the chromatographic membrane. The area of the front face 104 adjacent to the second edge 706 is a fourth distance 714 from the chromatographic membrane 120. The distances 708, 710, 712 and 714 are measured parallel to the rotational axis 702. The first edge 704 at least partially forms the inlet air baffle 128. The second edge 706 forms part of the outlet air baffle 130. Placing the first edge 704 above the front face 104 causes the inlet air baffle 128 to be like a scoop. When the second edge 706 is moved towards the first edge 704 rotationally this causes a scoop-like effect which forces air into the air volume 206. When the cartridge is rotated in the opposite direction such that the first edge 704 is moved in the direction of the second edge 706 then the air passes over the outer surface of the static cover 134 more easily. This may reduce airflow through the air volume 206. And have the effect of reducing evaporation of a fluid from the chromatographic membrane 120.

Figure 8:
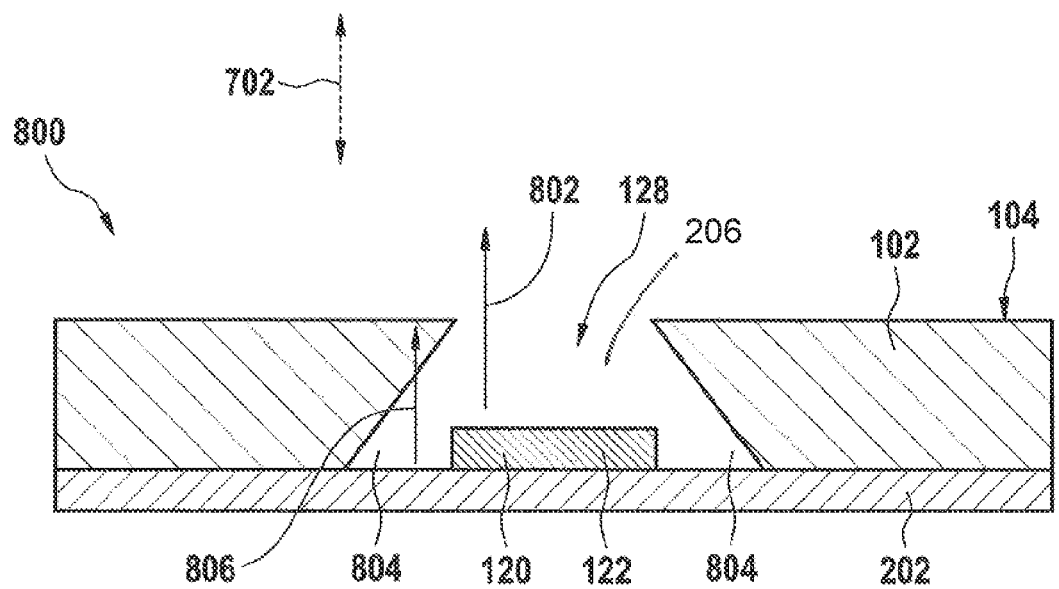
FIG. 8 shows an alternative cross sectional view of a cartridge.

FIG. 8 shows a further alternate cross-sectional view 800. In this example the static cover 134 is absent. In this example only the inlet air baffle 128 is present. The dashed line 702 again marks a direction parallel to the rotational axis. It can be seen that if a line 802 is taken parallel to the rotational axis 702 that there is a directed path 802 from the detection zone 122 which is not obstructed by the front face 104. To the side of the chromatographic membrane is an air pocket 804. There is an air pocket 804 on either side of the membrane 120. A path 806 parallel 702 to the rotational axis from the air pocket 804 reaches the front face 104. The effect of the air pockets 804 is to trap air in the space above the chromatographic membrane 120. This reduces the evaporation of fluid from the chromatographic membrane 120. The open space above the chromatographic membrane 120 can also be selectively placed above the detection zone 122. This would also eliminate the potential difficulty caused by condensation on the underside of the static cover 134.

FIG. 9 shows a further cross-sectional view 900. Again, like FIG. 8 there is a directed path 802 in a direction 702 parallel to the rotational axis that exposes the detection zone 122. In this embodiment 900 there are no air pockets. Instead there is a first air baffle which has a first air baffle edge 902 and a second air baffle edge 904. In the direction 702 parallel to the rotational axis the first air baffle edge 902 is a distance 906 from the chromatographic membrane 120. The front face is a distance 910 from the chromatographic membrane and the second air baffle edge 904 is a distance 908 from the chromatographic membrane 120. As the cartridge 100 is rotated the first air baffle edge 902 disrupts airflow to the chromatographic membrane 120 reducing the evaporation of fluid. In this example the second air baffle edge 904 is shown such that the distance 908 and 910 are equal. In other embodiments the distance 908 could be increased such that it is equal to or less than the distance 906.

FIG. 10 shows an alternative cross-sectional view 1000. The cross-sectional view 1000 is similar to that of FIG. 9 except the distance 908 has been increased such that it is equal to the distance 906.

Figure 11:
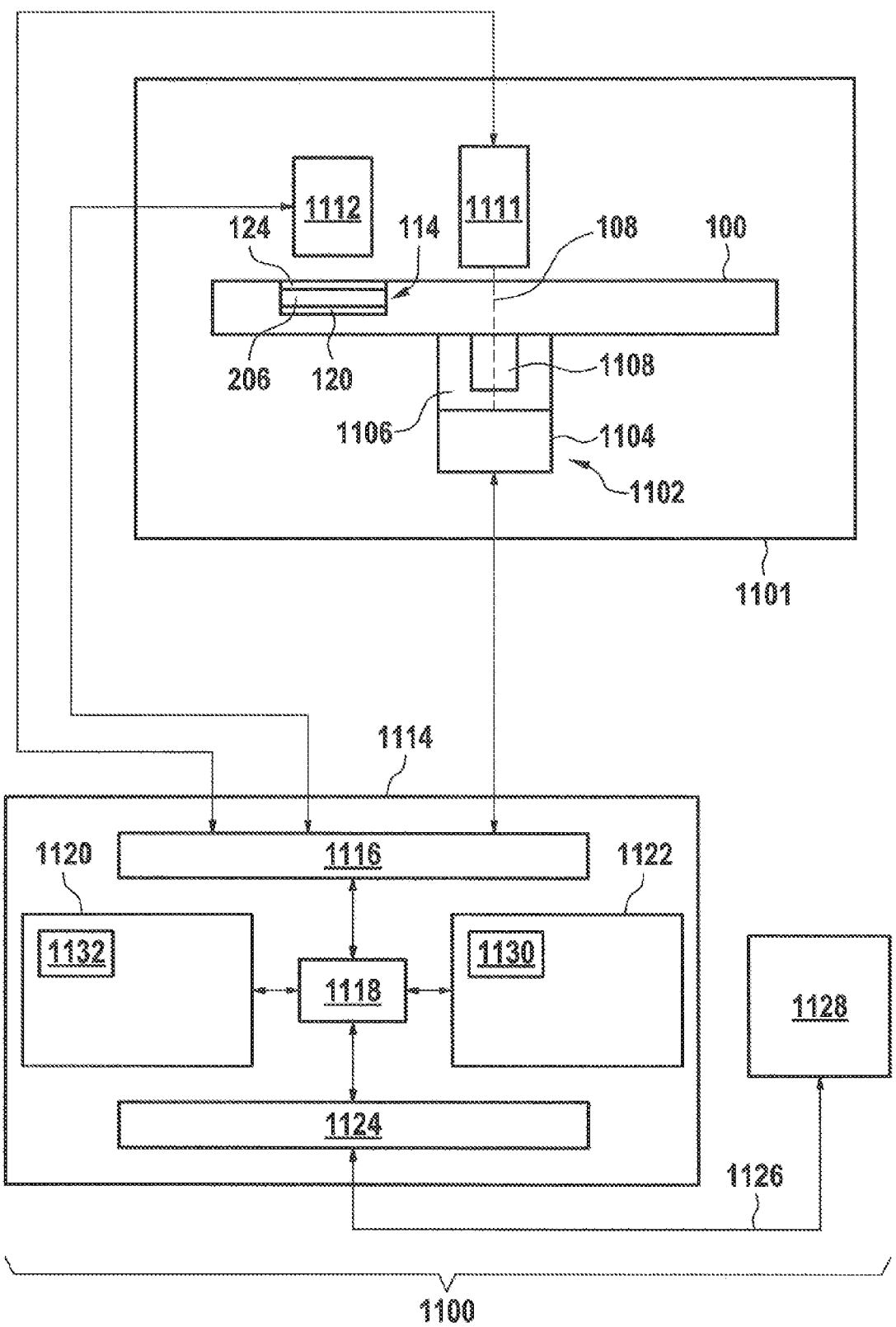
FIG. 11 shows an example of a medical system.

FIG. 11 shows an example of a medical system 1100. The medical system 1100 is adapted for receiving a cartridge 100. There is a cartridge spinner 1102 which is operable for rotating the cartridge 100 about the rotational axis. The cartridge spinner 1102 has a motor 1104 attached to a gripper 1106 which attaches to a portion of the cartridge 1108. The cartridge 100 is shown further as having a measurement structure 114. The cartridge 100 can be rotated such that the measurement structure 114 goes in front of an optical measurement system 1112 which can perform for example an optical measurement of the quantity of the analyte. An actuator 1111 is optionally shown in this FIG. 11. It can be used to open fluid reservoirs in the cartridge 100 or manipulate a dispenser to provide buffer solution to the cartridge. There may also be additional actuators or mechanisms for actuating mechanical valves or valve elements on the cartridge if they are present.

The actuator 1111, the cartridge spinner 1102, and the measurement system 1112 are shown as all being connected to a hardware interface 1116 of a controller 1114. The controller 1114 contains a processor 1118 in communication with the hardware interface 1116, electronic storage 1120, electronic memory 1122, and a network interface 1124. The electronic memory 1130 has machine executable instructions which enable the processor 1118 to control the operation and function of the medical system 1100. The electronic storage 1120 is shown as containing a measurement 1132 that was acquired when instructions 1130 were executed by the processor 1118. The network interface 1124 enables the processor 1118 to send the measurement 1132 via network connection 1126 to a laboratory information system 1128.

Figure 12:
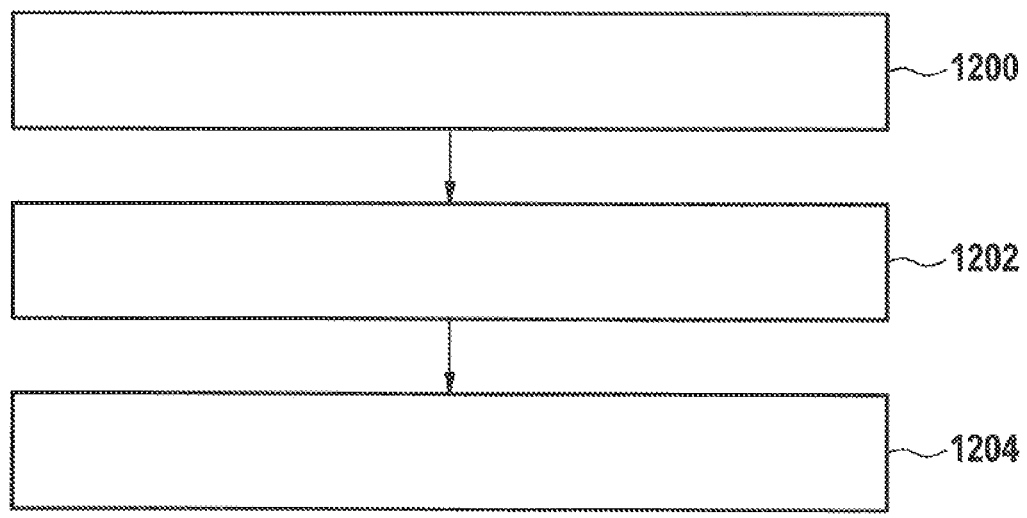
FIG. 12 shows a flow chart which illustrates a method of operating the medical system of FIG. 11.

FIG. 12 shows a flowchart, which illustrates a method of operating the medical system of FIG. 11. First in step 1200 the processor 1218 controls the cartridge spinner 1202 to control the rotational rate of the cartridge 100 to process the biological sample into the processed biological sample using the fluidic structure. Next in step 1202 the processor 1218 further controls the cartridge spinner 1202 to control the rotational rate of the cartridge to allow the processed biological sample to flow from the measurement structure inlet to the absorbent structure via the chromatographic membrane 120. During this process the inlet air baffle reduces the evaporation of the processed biological sample during rotation of the cartridge. Finally, in step 1204 the processor 1218 controls the optical instrument 1212 to perform the optical measurement of the detection zone.

LIST OF REFERENCE NUMERALS

- 100 cartridge
- 102 support structure
- 104 front face
- 106 edge
- 108 rotational axis
- 110 fluidic structure
- 112 sample inlet
- 114 measurement structure
- 116 measurement structure inlet
- 118 connection
- 120 chromatographic membrane
- 122 detection zone
- 124 optically transparent area
- 126 absorbent structure
- 128 inlet air baffle
- 128' inlet air baffle
- 130 outlet air baffle
- 130' outlet air baffle
- 132 cross section
- 132' cross section
- 134 static cover
- 140 gap
- 200 cross sectional view
- 202 cover
- 204 underside of optically transparent area
- 206 air volume
- 300 cross section
- 302 first continually smooth surface
- 304 second continually smooth surface
- 500 cross sectional view
- 502 chamfer
- 600 radial direction
- 700 cross sectional view
- 702 parallel to rotational axis
- 704 first edge
- 706 second edge
- 708 first distance to chromatographic membrane
- 710 second distance to chromatographic membrane
- 712 third distance to chromatographic membrane
- 714 fourth distance to chromatographic membrane
- 800 cross sectional view
- 802 directed path
- 804 air pocket
- 806 path
- 808 air pocket
- 900 cross sectional view
- 902 first air baffle edge
- 904 second air baffle edge
- 906 distance
- 908 distance
- 910 distance
- 1000 cross sectional view
- 1101 automatic analyzer
- 1100 medical system
- 1102 cartridge spinner
- 1104 motor
- 1106 gripper
- 1108 portion of cartridge
- 1111 actuator
- 1112 optical measurement system
- 1114 controller
- 1116 hardware interface
- 1118 processor
- 1120 electronic storage
- 1122 electronic memory
- 1124 network interface
- 1126 network connection
- 1128 laboratory information system
- 1130 executable instructions
- 1132 measurement
- 1200 control the rotational rate of the cartridge to process the biological sample into the processed biological sample using the fluidic structure
- 1202 control the rotational rate of the cartridge to allow the processed biological sample to flow from the measurement structure inlet to the absorbent structure via the chromatographic membrane
- 1204 perform the optical measurement of the detection zone with an optical instrument

What is claimed is:

1. A method of performing an optical measurement of an analyte in a processed biological sample using a cartridge, wherein the cartridge is operable for being spun around a rotational axis, wherein the cartridge comprises:

a support structure comprising a front face;

a fluidic structure for processing a biological sample into the processed biological sample, wherein the fluidic structure comprises a sample inlet for receiving the biological sample; and a measurement structure recessed from the front face, wherein the measurement structure comprises a chromatographic membrane, wherein the measurement structure comprises a measurement structure inlet connected to the fluidic structure to receive the processed biological sample, wherein the measurement structure comprises an absorbent structure, wherein the chromatographic membrane extends from the measurement structure inlet to the absorbent structure, wherein the chromatographic membrane comprises a detection zone, wherein the measurement structure comprises an inlet air baffle connected to the front face, wherein there is a gap between the inlet air baffle and the measurement structure inlet, and wherein the inlet air baffle is configured for regulating a flow of air over the measurement structure during rotation of the cartridge about the rotational axis;
wherein the method comprises:
placing the biological sample into the sample inlet;
controlling the rotational rate of the cartridge to process the biological sample into the processed biological sample using the fluidic structure;
controlling the rotational rate of the cartridge to allow the processed biological sample to flow from the measurement structure inlet to the absorbent structure via the chromatographic membrane, wherein the inlet air baffle reduces the evaporation of the processed biological sample during rotation of the cartridge; and
performing the optical measurement of the detection zone with an optical instrument.

2. The method of claim 1, wherein the air inlet baffle is closer to the rotational axis than the measurement structure inlet.

3. The method of claim 1, wherein the method further comprises:
placing buffer solution at the measurement structure inlet after controlling the rotational rate of the cartridge to allow the processed biological sample to flow from the measurement structure inlet to the absorbent structure via the chromatographic membrane; and
washing the chromatographic membrane by controlling the rotational rate of the cartridge to allow the buffer solution to flow from the measurement structure inlet to the absorbent structure via the chromatographic membrane before performing the optical measurement.

4. A cartridge for an automatic analyzer, wherein the cartridge is operable for being spun around a rotational axis, wherein the cartridge comprises:
a support structure, wherein the support structure comprises a front face;
a fluidic structure for processing a biological sample into a processed biological sample, wherein the fluidic structure comprises a sample inlet for receiving the biological sample; and
a measurement structure recessed from the front face, wherein the measurement structure comprises a chromatographic membrane, wherein the measurement structure comprises a measurement structure inlet connected to the fluidic structure to receive the processed biological sample, wherein the measurement structure comprises an absorbent structure, wherein the chromatographic membrane extends from the measurement structure inlet to the absorbent structure, wherein the measurement structure comprises an inlet air baffle connected to the front face, wherein there is a gap between the inlet air baffle and the measurement structure inlet, and wherein the inlet air baffle is configured for regulating a flow of air over the measurement structure during rotation of the cartridge about the rotational axis.

5. The cartridge of claim 4, wherein the air inlet baffle is closer to the rotational axis than the measurement structure inlet.

6. The cartridge of claim 1, wherein the gap is over the chromatographic membrane.

7. The cartridge of claim 4, wherein the measurement structure further comprises a static cover for covering the chromatographic membrane, wherein the static cover comprises an optically transparent area, wherein the optically transparent area is fixed in alignment with the detection zone of the chromatographic membrane, wherein the measurement structure further comprises an outlet air baffle connected to the front face, and wherein the measurement structure is vented by the outlet air baffle and the inlet air baffle.

8. The cartridge of claim 7, wherein the detection zone has a detection zone length in a radial direction, wherein the inlet air baffle has an inlet air baffle length in the radial direction, wherein outlet air baffle has an outlet air baffle length in the radial direction, wherein the inlet air baffle length and/or the outlet air baffle length is less than the detection zone length.

9. The cartridge of claim 8, wherein one of the outlet air baffle and the inlet air baffle is closer to the rotational axis.

10. The cartridge of claim 7, wherein the detection zone has a detection zone length in a radial direction, wherein the inlet air baffle has an inlet air baffle length in the radial direction, wherein outlet air baffle has an outlet air baffle length in the radial direction, wherein the inlet air baffle length and/or the outlet air baffle length is greater than or equal to the detection zone length.

11. The cartridge of claim 10, wherein the inlet air baffle has a first continually smooth surface where the inlet air baffle meets the front face and/or wherein the outlet air baffle has a first continually smooth surface where the inlet air baffle meets the front face.

12. The cartridge of claim 10, wherein along a circumferential path across the detection zone the static cover has a first edge and a second edge, wherein the first edge is a first distance from the chromatographic membrane along the rotational axis, wherein the second edge is a second distance from the chromatographic membrane along the rotational axis, wherein the first distance is less than the second distance, wherein adjacent to the first edge the front face is a third distance from the chromatographic membrane along the rotational axis, wherein the first distance is greater than the third distance, and wherein at the front face the static cover is continually smooth between the first edge and the second edge.

13. The cartridge of claim 4, wherein the entire measurement zone is open to the front face via the first air baffle structure along a directed path, and wherein the directed path is parallel to the rotational axis.

14. The cartridge of claim 4, wherein the measurement structure comprises at least one air pocket adjacent to the chromatographic membrane, wherein the at least one air pocket is covered by the front face parallel to the rotational axis.

15. The cartridge of claim 13, wherein along a circumferential path across the detection zone the inlet air baffle has a first air baffle edge and a second air baffle edge where the inlet air baffle meets the front face.

16. The cartridge of claim 15, wherein along the rotational axis the first air baffle edge is further from the chromatographic membrane than the second air baffle edge.

17. The cartridge of claim 15, wherein the front face has an average distance from the chromatographic membrane along the rotational axis, wherein the first air baffle edge and the second air baffle edge are further from the chromatographic membrane than the front face along the rotational axis.

18. A medical system, wherein the medical system comprises a cartridge according to claim 4, wherein the medical system further comprises an automatic analyzer configured for receiving the at least one cartridge, wherein the automatic analyzer comprises a cartridge spinner, an optical instrument, and a controller configured to control the automatic analyzer, wherein the controller is configured for:

controlling the rotational rate of the cartridge to process the biological sample into the processed biological sample using the fluidic structure;

controlling the rotational rate of the cartridge to allow the processed biological sample to flow across the fluidic membrane from the measurement structure inlet to the absorbent structure via the chromatographic membrane, wherein the inlet air baffle reduces the evaporation of the buffer solution; and performing the optical measurement of the detection zone with the optical instrument.

19. The cartridge of claim 7, wherein the inlet air baffle and outlet air baffle are configured for controlling an amount of air going through a space above the chromatographic membrane and below the optically transparent area.

* * * * *